(12) United States Patent
Cetin et al.

(10) Patent No.: US 7,453,819 B2
(45) Date of Patent: Nov. 18, 2008

(54) METHOD FOR TRAFFIC ENGINEERING AND INGRESS ROUTER ADAPTED TO PERFORM SUCH A METHOD

(75) Inventors: Figen Cetin, Antwerp (BE); Riza Cetin, Antwerp (BE)

(73) Assignee: ALCATEL, Paris (FR)

( * ) Notice: Subject to any disclaimer, the term of this patent is extended or adjusted under 35 U.S.C. 154(b) by 761 days.

(21) Appl. No.: 10/691,651

(22) Filed: Oct. 24, 2003

(65) Prior Publication Data
US 2004/0114583 A1 Jun. 17, 2004

(30) Foreign Application Priority Data
Oct. 29, 2002 (EP) .................. 02292681

(51) Int. Cl.
H04L 12/26 (2006.01)
(52) U.S. Cl. ....................... 370/252; 370/412
(58) Field of Classification Search ............. 370/230.1, 370/235, 232, 231, 468, 395.21, 252, 416, 370/412
See application file for complete search history.

(56) References Cited
U.S. PATENT DOCUMENTS

| 6,522,627 | B1 * | 2/2003 | Mauger ................. | 370/230 |
| 6,665,273 | B1 * | 12/2003 | Goguen et al. ........... | 370/252 |
| 7,023,856 | B1 * | 4/2006 | Washabaugh et al. .... | 370/395.1 |
| 2001/0033581 | A1 * | 10/2001 | Kawarai et al. ......... | 370/468 |
| 2004/0081197 | A1 * | 4/2004 | Liu ..................... | 370/468 |

OTHER PUBLICATIONS

Heinanen, "Integrating MPLS and DiffServ to Assure QoS", Faster Workshop '01, Jan. 11, 2001, pp. 1-17.
Jaffe et al., "Smart Networks Project Overview", Internet Report, Sep. 2000, pp. 1-25.
Le Faucher et al., "Multi-Protocol Label Switching (MPLS) Support of Differentiated Services" (RFC 3270), Request for Comments, May 2002, pp. 1-64.
Andrikopoulous et al., "Supporting differentiated services in MPLS networks" International workshop on Quality of Service, May 31, 1999, pp. 207-215.

* cited by examiner

Primary Examiner—Ricky Ngo
Assistant Examiner—Gary Mui
(74) Attorney, Agent, or Firm—Sughrue Mion, PLLC.

(57) ABSTRACT

A method for engineering traffic between an ingress router and an egress router of a packet network, whereby the traffic is scheduled within the ingress router in queues pertaining to different service classes, and whereby part of the traffic follows a dedicated tunnel between the ingress and egress routers, includes the step of provisioning of a tunnel queue dedicated to the part of the traffic intended to flow via the dedicated tunnel, for separately and temporarily storing the part of the traffic towards the dedicated tunnel, and a further step of shaping the part of the traffic towards the dedicated tunnel before entering the traffic tunnel. Further embodiments include the provisioning of a set of queues, pertaining to the different service classes, to one or more of these dedicated traffic tunnels, as well as the provisioning of associated shapers.

20 Claims, 1 Drawing Sheet

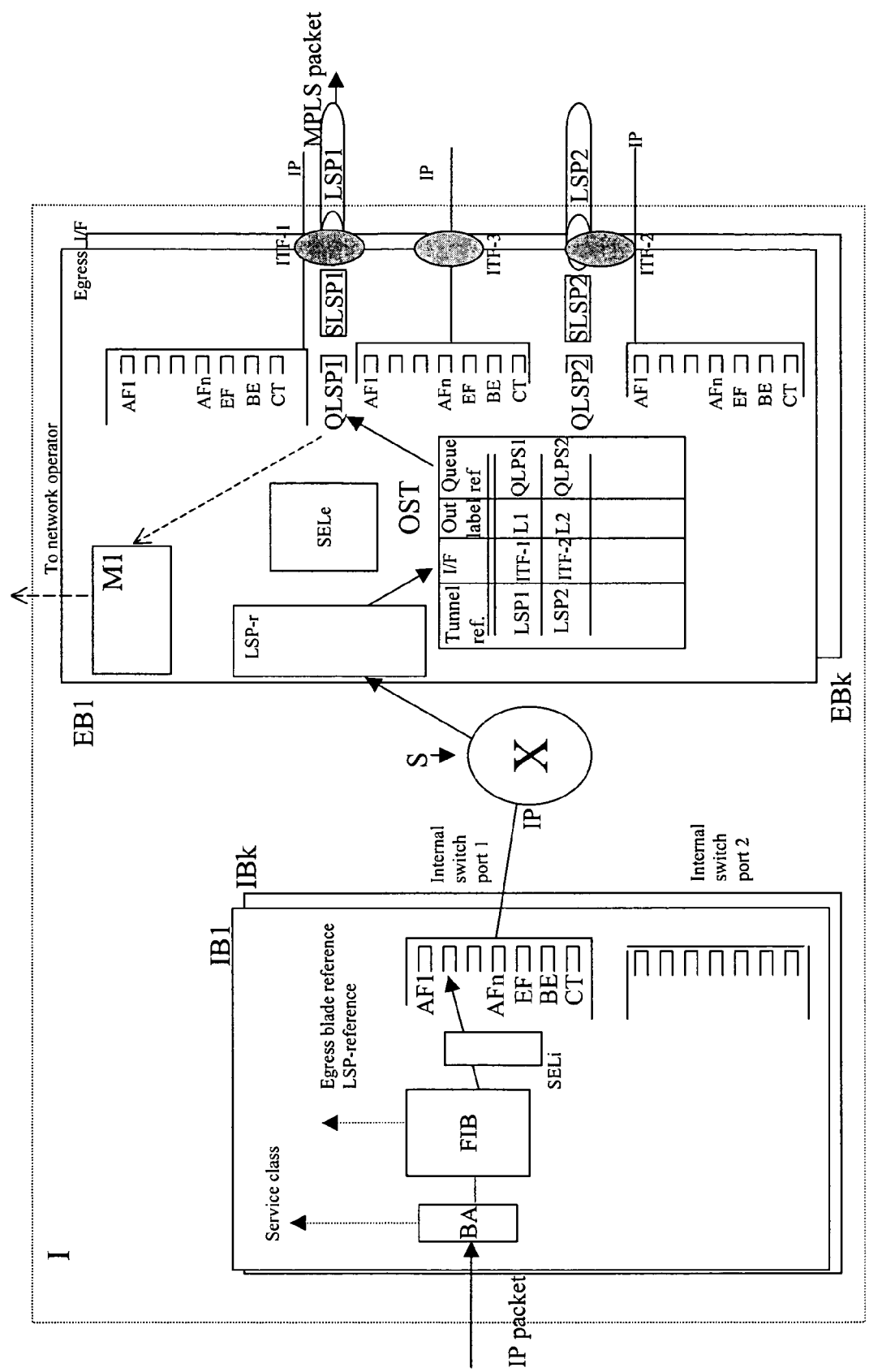

METHOD FOR TRAFFIC ENGINEERING AND INGRESS ROUTER ADAPTED TO PERFORM SUCH A METHOD

BACKGROUND

The present invention relates to a method for traffic engineering and to an ingress router.

Such a method is already known in the art, e.g. from RFC3270 of the IETF working group.

Therein the basic principles for queuing packets according to their service class, in this document called a Behavior Aggregate and abbreviated with BA, within ingress routers of a packet network such as the Internet, is described. This is supplemented by what is described in another RFC at the same webpage, being RFC3290, in which a BA-classifier and the different queues are further described, the BA-classifier being the device within the ingress source router which determines in which queue a packet will be temporarily stored. Furthermore RFC 3031 from the same webpage describes the concept of having dedicated tunnels to which traffic can flow.

State of the art Internet ingress routers are thus adapted to discriminate incoming packets into those following the "normal" IP-route, and those intended to follow the tunnel, in the Internet case being mostly MPLS-tunnels. Moreover, these state of the art routers can further discriminate between the different service classes of the packets such that, per egress interface of such an ingress router, several queues are present. These queues can for instance consist of Diffserv queues in the Internet, and being one per service class, in which all packets intended to be transported over that interface are classified in accordance to their service class. It is important to recognize that in this case no distinction is made between the "normal" IP-traffic, and the "tunnel" MPLS-traffic, in other words, both traffic type packets are stored in the same queue if these have the same service category.

This state of the art method and ingress router however has the drawback that the MPLS tunnel can be easily overloaded with traffic, since the estimated bandwidth for this tunnel, which is initially communicated by the network administrator and which is reserved for the specific tunnel, is just a prediction which may prove not be very realistic, and which may give rise to congestion problems. In the present situation no traffic engineering solution is thus available for the traffic intended for the MPLS-tunnels.

BRIEF DESCRIPTION

An object of the present invention is thus to provide such a method for traffic engineering within a packet network, especially for that part of the traffic intended to a specific tunnel.

In this way, by providing a dedicated tunnel queue per tunnel within the ingress router, and by further shaping the traffic by a dedicated shaper per tunnel queue or per tunnel, a simple method for traffic engineering the traffic intended for the tunnel is provided.

By providing, per tunnel, a set of queues, one per service class, differentiation between the service classes for one tunnel is provided. In this case, total tunnel traffic, is shaped, while a set of queues, one per service class is created for the tunnel. The advantage of this is that the total tunnel traffic is limited at a certain shaper rate while each different service class is still treated separately according to their service class, such as the diffServ characteristics, in the tunnel.

The distinction between the different service classes can be even more further elaborated by providing a separate shaper for each of these queues, such that a traffic engineering tunnel can be further used to engineer multiple service classes. In this case, having one queue and associated shaper per service class of the tunnel allows monitoring and shaping each service class traffic separately.

Thereby one set of queues, each queue of the set pertaining to a different service class, is provided for the traffic for a plurality of tunnels, all tunnels of this plurality pertaining to the same egress interface of this ingress router.

A monitoring device is provided, specifically to control the load or traffic via this dedicated tunnel or the plurality of tunnels. This may be performed by periodically measuring the number of packets and their size sent out from the queues, or the number of octets sent out from the queues. On the basis of this monitoring, a comparison can be made with the predetermined reserved bandwidth for the tunnel. This may for instance be performed by comparing the monitored traffic with a predetermined threshold related to this predetermined reserved bandwidth. If this threshold is exceeded, a notification message to the network administrator is generated. The latter can then, based on such a message, increase the reserved bandwidth for the tunnel or the plurality or tunnels, which may in its turn result in calculating a new path for the tunnel or tunnels with this new bandwidth. Furthermore, this can also result in providing new shaping parameters by the network administrator to the dedicated tunnel shapers.

In addition to the aforementioned features, the present method is enabled by the network administrator through the sending of a predetermined message to the ingress router.

The above and other objects and features of the invention will become more apparent and the invention itself will be best understood by referring to the following description of an embodiment taken in conjunction with the accompanying drawing wherein the FIGURE schematically shows details of an ingress router according to the present invention.

BRIEF DESCRIPTION OF THE DRAWINGS

FIGURE schematically shows ingress and egress routers.

DETAILED DESCRIPTION

The present invention is used in the field of packet networks, for instance the Internet, wherein, apart from the conventional IP forwarding or next-hop calculation per router, based on the header of each incoming IP packet, also predetermined label switched paths or tunnels are present. In the drawing an ingress router I is depicted to which IP packets may arrive at a number of ingress blades IB1 to IBk. In the drawing an IP packet is depicted which arrives at ingress blade IB1. The determination of whether an incoming IP packet will be forwarded using the conventional IP routing, or will be transferred via the MPLS tunnel, from this ingress router I to an (not shown) egress router, is decided upon within the ingress router, within the FIB-look-up device, denoted FIB. This FIB-look-up device is further adapted to determine which egress blade, and which egress interface of this egress blade of the ingress router I, will be used for sending the packet to. In the FIGURE a situation is depicted whereby egress blade EB1 is selected, and egress interface ITF-1 thereof. In the embodiment depicted in the FIGURE, the ingress router includes n of such egress blades which are coupled, via an internal switch S, to ingress blades IB1 to IBk. Moreover, another function of this FIB-device is the determination of the tunnel reference, also called LSP-reference, which will be described as well as its use, within a further paragraph of this document.

In addition to the destination information, each incoming IP packet is attributed a predetermined service class, via for instance the DSCP which is the abbreviation of Differentiated Services Code Point marker in the header of each packet. For appropriately and adequately coping with the different bandwidth reserved for these separate classes, separate queues per class are foreseen per ingress blade, and which are denoted AF1 to AFn, EF, BE and CT. These are respectively the abbreviation of Assured Forwarding, Expedited Forwarding, Best Effort and Control Traffic as standardized by the DiffServ working group at IETF. Traffic pertaining to these different classes will be scheduled and shaped differently, according to initialized or updated bandwidth and other constraints such as weight, priority (real-time or non-real-time) constraints. Therefore the incoming packets will first be temporarily stored in separate queues, per service class in the ingress blade. The determination of the appropriate queue wherein each incoming packet is to be stored, is performed in the device BA-IP Classifier, denoted with BA, which determines, based on information within the incoming packet such as the DSCP marker of the incoming packet, the appropriate service class.

The information extracted within the BA and FIB-devices, in the FIGURE denoted with the arrows in dotted lines, is then used within an ingress selector, denoted SELi, in order to determine an internal switch port such as for instance switch port 1 in the FIGURE, of the ingress blade, and to determine a specific queue associated to this internal switch port, towards which the packet will be sent for temporary storage on the ingress blade.

In the ingress router I depicted in the FIGURE, the incoming packets per ingress blade will be further forwarded towards an appropriate egress interface on an appropriate egress blade. To each of these egress interfaces, and for each egress blade, a similar set of service class queues is foreseen for temporarily storing the incoming packets. In the FIGURE egress blade EB1 is depicted as having three egress interfaces, respectively denoted ITF-1, ITF-2, and ITF-3, and indicated by means of the gray ellipse. One of these egress interfaces, being ITF-3 is only pertaining to classical IP-traffic and has the traditional set of service-class queues, again denoted AF1 to Afn, EF, BE and CT. ITF-1 and ITF-2 are, apart from the conventional IP-traffic, also adapted to carry tunnel traffic such as MPLS traffic. Two respective tunnels, LSP1 and LSP2, are therefore originating from respectively ITF-1 and ITF-2. For LSP1, L1 is the outgoing MPLS label, for LSP2, L2 is the outgoing label. These are not shown as such in the FIGURE but are important for the further routing of the packet.

In the drawing, the links carrying the IP-traffic are indicated with IP, whereas the tunnels are indicated by means of their tunnel reference.

To this purpose, both interfaces are not only coupled to the classical set of queues as described before, but, as an important feature of the present invention, also to at least one dedicated queue per tunnel. This is clear from the FIGURE, where interface ITF-1 is not only coupled to a set of queues similar to the one of for instance interface ITF-3, but is also coupled to a dedicated tunnel queue denoted QLSP1. Similarly, to ITF-2 is coupled a dedicated tunnel queue QSLP2, apart from the conventional set of queues.

The determination of the queue on the egress blade, where each packet will be temporarily stored, is performed in several steps. Firstly a LSP-ref-check device, denoted LSP-r on the FIGURE, is adapted to check whether the incoming packet on the egress blade EB-1 has to follow the classical IP forwarding, or an MPLS-tunnel. If classical IP, an egress selector, denoted SELe, having similar functionality as the ingress selector SELi on the ingress blade, determines the appropriate egress interface and queue thereof, on the basis of the service class and egress-interface reference. This information is for instance derived within the SELe device itself from a special packet header which was added in front of the IP-packet, within an encapsulating device (not shown on the FIGURE) ingress blade. This special header contains internal parameters like service class, egress-blade reference, egress-interface reference, LSP reference etc., which were earlier determined within the ingress blade of the ingress router, within devices such as BA and FIB.

In case the LSP-r device finds out that the packet is to be sent via an MPLS-tunnel, an out-segment table, denoted OST in the FIGURE, is used to determine the appropriate storage queue on the basis of the tunnel reference or tunnel label, extractable from the special packet header.

In another embodiment (not shown on the FIGURE) even a set of queues, one for each service class, for one or more tunnels pertaining to the same egress interface, is present. This allows to further differentiate the MPLS traffic across the different service classes within the same tunnel, in case a set of queues exists for one tunnel, or within a group of tunnels, in case a set queues exists for a group of tunnels pertaining to the same egress interface.

In the shown embodiment, whereby for each MPLS tunnel, one queue was foreseen, also one associated shaper is present in the egress blade. These are respectively denoted SLSP1 and SLSP2, and will then adapt the traffic for the respective MPLS tunnel LSP1 and LSP2, in accordance with the reserved bandwidth such as the Peak Information Rate configured for the queue.

It can be further remarked that such shapers may also be present, although not shown in the FIGURE, for each IP queue.

For the tunnel or MPLS shapers, embodiments whereby the Peak Information Rate of the separate shapers is set to the reserved bandwidth of the tunnel, are possible. However other shaper devices may be provided, where other traffic parameters, determined initially by the network administrator, are used. Since these shapers are well known to a person skilled in the art, such shapers will not be further discussed into detail.

To determine in which queue an MPLS packet will be stored, the OST is extended with the queue-reference. In another embodiment, in case of several tunnel queues per tunnel, according to their service class, an OST-table with also only one queue reference added can be envisaged, whereby this extra reference will then be a reference to a tunnel-queue-block. At the entry of the queue-block it can then be further determined which actual queue will be taken for the storage of the packet. However, the out-segment table could as well be updated with the actual queue reference.

The OST-table, as depicted in the FIGURE, uses the tunnel reference as index to this table, and includes entries such as the outgoing label of the tunnel (L1 or L2), the egress interface (ITF-1 or ITF-2) and the queue reference (QLSP1 or QLSP2).

In the FIGURE each egress blade further includes a monitoring device. However other embodiments may include monitoring devices per queue, or per egress interface. The function of such a monitoring device is to monitor the traffic via the tunnels. This may be performed by monitoring the queues attached to any of the egress interfaces of an egress blade. To this purpose, this device is adapted to monitor the amount of the traffic sent from the queue, for instance by checking the occupation of each queue, and to compare this with a predetermined threshold related to an initial reserved bandwidth for this tunnel. Furthermore such a monitoring device is further adapted to generate a message to the network administrator in case of overflow conditions. Thus the occupancy of the respective tunnel queues will be monitored, and in case of overflow, a message will be generated to the network administrator, indicative of traffic problems such as congestion. The network administrator (not shown on the drawing) can then adapt the tunnel, this generally implying determining a new "tunnel path", possibly including the selection of a new egress blade, and a new egress interface. This means that this information again has to be provided to the FIB classifier. Also the shaping device attributed to the tunnel has to be informed since traffic will now have to be differently shaped.

An additional feature of the method of the present invention is that the network administrator can enable this method, thus can enable the feature of having the separate queue per tunnel. To this purpose a message is sent (not shown in the drawing) from the network administrator, for instance by means of the Simple Network Management Protocol, abbreviated by SNMP-protocol, wherein a new tunnel configuration object indicates or orders the ingress router to enable such a dedicated queue for a tunnel. This is usually performed by means of an additional management object of a so-called MIB, being the abbreviation of Management Information Base. However, other means of communication are possible, for instance by using the CLI Command Line Interface. The ingress router is then also adapted to receive such a message, and to extract from its contents the indication whether or not to enable such a separate tunnel queue per tunnel, and to enable the queue in the requested case. In another embodiment, where several queues per tunnel, pertaining to different service classes, are possible, this message from the network administrator to the ingress router may as well contain details about the enabling of the plurality of queues per tunnel. Similarly, in these embodiments the ingress router is then further adapted to extract from the contents of this message whether to enable the queues or not, and accordingly perform so.

While the principles of the invention have been described above in connection with specific apparatus, it is to be clearly understood that this description is made only by way of example and not as a limitation on the scope of the invention, as defined in the appended claims.

The invention claimed is:

1. A method for engineering traffic between an ingress router and an egress router of a packet network, the method comprising:
   scheduling traffic within an ingress router in queues pertaining to different service classes;
   determining a part of the traffic which will follow a dedicated tunnel between said ingress router and an egress router;
   provisioning a tunnel queue dedicated to said part of the traffic intended to flow via said dedicated tunnel, for separately and temporarily storing said part of the traffic towards said dedicated tunnel; and
   shaping said part of the traffic towards said dedicated tunnel before transmitting said part of the traffic in said tunnel.

2. The method according to claim 1, further comprising:
   providing a set of tunnel queues, associated to said dedicated traffic tunnel, each tunnel queue within said set pertaining to a different service class.

3. The method according to claim 2, further comprising:
   providing a separate shaper to each tunnel queue of said set for shaping the traffic from said each tunnel queue of said set.

4. The method according to claim 2, further comprising:
   associating said set of tunnel queues to a plurality of dedicated traffic tunnels pertaining to the same egress interface of said ingress router.

5. The method according to claim 4, further comprising:
   monitoring the traffic via said plurality of dedicated tunnels at said egress interface;
   comparing the result of said monitoring with a reserved bandwidth for said plurality of dedicated tunnels; and
   depending upon the result of said comparing, informing a network administrator of information regarding the result of said comparing by sending a message to said network administrator.

6. The method according to claim 1, further comprising:
   monitoring the traffic via said dedicated tunnel,
   comparing a result of said monitoring with a reserved bandwidth for said dedicated tunnel, and,
   depending upon the result of said comparison, informing a network administrator of information regarding the result of said comparing by sending a message to said network administrator.

7. The method according to claim 6, further comprising:
   upon receipt of the message indicating that the traffic through said dedicated tunnel exceeds a predetermined value, increasing by said network administrator the reserved bandwidth, including calculating a new path or paths for said dedicated tunnel between said ingress router and said egress router.

8. The method according to claim 1, wherein:
   provisioning said tunnel queue is dependent upon sending, by said network administrator, of a message enabling provisioning.

9. The method according to claim 1, wherein the dedicated tunnel includes a multi-protocol label switching (MPLS) tunnel.

10. An ingress router of a packet network, comprising:
    a classifier which determines a service class for each received packet to be stored in a service class queue based on the determined service class:
    a look-up device which identifies a part of the received packets as special packets which are to be transferred from the ingress router to an egress router in a dedicated tunnel, separately from a remainder of the received packets:
    at least one tunnel queue dedicated and associated to said dedicated tunnels, to temporarily store the identified part of the received packets; and
    at least one tunnel shaper, associated to said dedicated tunnel which tunnel shaper shapes the identified part of the received packets of said dedicated tunnel before transmitting.

11. The ingress router according to claim 10, further comprising:
    at least one set of tunnel queues, pertaining to different service classes, and associated to said dedicated tunnel.

12. The ingress router according to claim 11, further comprising:
    at least one set of tunnel shapers associated to said dedicated tunnel.

13. The ingress router according to claim 11, wherein:
said set of tunnel queues pertaining to different service classes is associated to a plurality of dedicated tunnels pertaining to the same egress interface of said ingress router.

14. The ingress router according to claim 10, further comprising:
a monitoring device which monitors the traffic of said dedicated tunnel, compares said traffic with a predetermined threshold related to a reserved bandwidth for said dedicated tunnel, and generates a message to a network administrator depending on the result of said comparison.

15. The ingress router according to claim 10, wherein:
said tunnel queue is enabled based on a determination as to whether or not to enable said tunnel queue to receive packets intended for said dedicated tunnel, said determination made from a predetermined message received from a network administrator, said message related to enabling of said tunnel queue.

16. The router according to claim 10, wherein the dedicated tunnel includes a multi-protocol label switching (MPLS) tunnel.

17. A method, comprising:
reading identification information in each incoming packet at an ingress router which includes a first queue set and a second queue set, each queue in the first and second set is associated with a corresponding service class;
identifying a service class of the incoming packets based on the identification information;
classifying the incoming packets into one of standard packets or special packets based on the identification information, the special packets are to be transmitted in a dedicated ingress tunnel between the ingress router and an egress router;
prior to transmitting the packets, storing the packets in a queue of one of the first queue set if the packet is classified as the standard packet or the second queue set if the packet is classified as the special packet, based on the identified service class;
shaping the special packet stored in the queue of the second queue set;
transmitting the standard packets from the queues of the first queue set via an ingress general tunnel; and
transmitting the special packets from the queues of the second queue set via the dedicated ingress tunnel coupled to the second queue set.

18. The method according to claim 17, further comprising:
prior to transmitting, determining an egress interface reference including an egress blade and an egress interface to which the packet is to be transmitted based on the identified service class of the packet and packet classification;
creating a special packet header which includes the identified service class and determined egress interface reference;
receiving each transmitted packet at the determined egress blade which includes interfaces each including at least one of a set of standard egress queues, which standard set is coupled to a general output tunnel, or a set of special egress queues which is coupled to an output dedicated data tunnel;
determining the egress interface and the egress queue based on the special packet header;
routing the standard packet into a corresponding standard egress queue based on the service class;
routing the special packet to a corresponding special egress queue based on the service class;
transmitting the standard packet from the standard egress queue via the output general tunnel; and
transmitting the special packet from the special egress queue via the output special tunnel.

19. The method according to claim 18, wherein the output general tunnel includes an internet protocol (IP) tunnel and the output dedicated tunnel includes a multi-protocol label switching (MPLS) tunnel.

20. The method according to claim 17, wherein the general ingress tunnel includes an internet protocol (IP) tunnel and the dedicated ingress tunnel includes a multi-protocol label switching (MPLS) tunnel.

* * * * *